March 24, 1970 E. F. LINDQUIST ET AL 3,502,850

DATA SENSING SYSTEM FOR A DOCUMENT SCANNER

Filed May 25, 1967 2 Sheets-Sheet 1

INVENTORS
EVERET F. LINDQUIST
GEORGE E. CARSNER

BY James C. Kemmers

ATTORNEY

DATA SENSING SYSTEM FOR A DOCUMENT SCANNER

Filed May 25, 1967 2 Sheets-Sheet 2

INVENTORS
EVERETT F. LINDQUIST
GEORGE E. CARSNER
BY James C. Nemmers
ATTORNEY 3,502,850

DATA SENSING SYSTEM FOR A DOCUMENT SCANNER

Everet F. Lindquist, 1012 Highwood Drive, and George E. Carsner, 411 Terrace Road, both of Iowa City, Iowa 52240

Filed May 25, 1967, Ser. No. 641,281
Int. Cl. G06k *7/10, 19/00;* G01n *21/30*
U.S. Cl. 235—61.11 8 Claims

ABSTRACT OF THE DISCLOSURE

An improved data sensing system for a document scanner, which system will generate timing pulses as substitutes for pulses that are normally generated by timing marks on the document but which are not generated because the timing marks are bridged or otherwise fail to generate the proper timing pulses.

BACKGROUND OF THE INVENTION

This invention relates to the processing of data and more particularly relates to an apparatus and system for scanning and "reading" documents to obtain information from them. Document scanning machines of the type to which the invention relates require that timing marks be printed on the document to tell the machine when to "read." These timing marks are commonly small black rectangles printed in a column along one edge of the document, and each mark normally causes an electronic signal or pulse to be generated to trigger the data sensors. On documents containing rows of data, there is generally one such timing mark in line with each row of data to be read by the machine, and there are spaces between successive timing marks. In order for a separate pulse to be generated for each and every row of data, there must be distinct spaces between the timing marks. It sometimes happens that the spaces between the timing marks become filled in or obscured by deliberate or unconscious "doodling," by accidental pencil strokes, by smudging of the ink when the document is printed, etc. When two or more timing marks become "bridged" because the space between them is darkened or filled in, a trigger or timing pulse signal is generated by the first of the bridged marks, but a pulse will not be generated by any of the succeeding marks joined to it. In other words, when marks are bridged for any reason, only a single pulse will be generated for the bridged group, and consequently, the data sensors will only read the row of data opposite the first of the bridged timing marks. Thus, not all of the data from that document will be scanned and read, and the data that is read will show erroneous results.

In some high-speed document scanners of the type to which the invention relates, means is provided which will indicate when all the data on a document has not been scanned. However, that document must be removed and manually read in order to obtain the correct data. Obviously, where a document contains considerable data, as do many of present-day documents, designed for machine reading, this is an extremely time-consuming process. There is not known to us any document scanner or reader which will properly read all of the data on a document unless the timing marks are all properly positioned and separated and in no way obscured at the time the document is passed through the document reader.

SUMMARY OF THE INVENTION

In the usual data sensing system of the prior art, a single timing mark sensor is utilized to detect the presence of a timing mark and, through appropirate circuitry, the sensor will cause a pulse to be generated to trigger the data sensors. The system of the present invention employs multiple timing mark sensors which are aligned with the path of travel of the column of timing marks on a document passing through the document reader. The multiple sensors are spaced apart along this columnar line the same distance as the spacing of the timing marks, and are therefore in position to simultaneously sense consecutive timing marks passing beneath them. Circuitry is provided in the system which will emit a timing pulse if at least one of the sensors detect the leading edge of a timing mark. Thus, even though a "bridge" exists between two or three successive marks, one of the sensors will "read" a mark and a timing pulse will be generated. By using the principles of the invention, three timing mark sensors will thus produce the proper timing pulses where three consecutive marks are bridged and the use of N sensors will generate substitute pulses for the missing pulses where N marks are bridged.

DESCRIPTION OF THE PREFERRED EMBODIMENT

Figure 1:
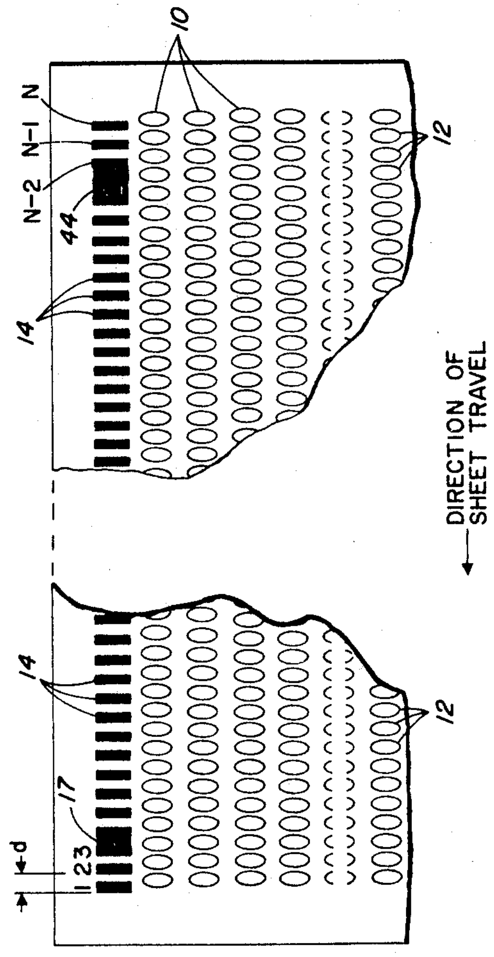
FIG. 1 illustrates one type of data containing document and shows the timing marks in a column along the left side of the document.
Figure 2:
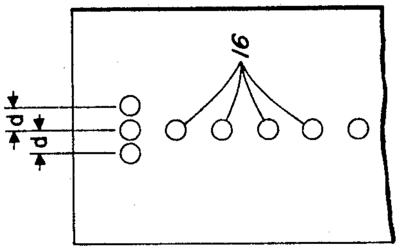
FIG. 2 is a plan view of a portion of an apparatus illustrating the relative positions of data and timing mark sensors.

An early version of machines of the general type to which this invention relates is disclosed in U.S. Patent No. 3,050,248, issued Aug. 21, 1962, to Everet F. Lindquist. In machines of this type, as well as most machines which automatically scan and "read" data from documents, timing marks must be printed on the document to "tell" the machine where the data is that is to be read and when to read it. In FIG. 1, there is illustrated a portion of one type of such a document for use in recording information such as answers to tests. Such documents commonly have a plurality of columns 10 of boxes or other data recording spaces. As indicated, the boxes are also printed and arranged in horizontal rows 12, and in alignment with each is a timing mark 14. Timing marks 14 are arranged in a column parallel to columns 10 along one edge of the document and, as indicated, spaces are provided between successive timing marks. This column of timing marks is sometimes referred to as the "scan track."

In order to read the data contained on the document, a plurality of data sensors 16 are arranged in a line transverse to the direction of travel of the document through the reader. Sensors 16 are preferably photo-transistors, the characteristics of which change when the light reflected or transmitted to them varies. Each data row is illuminated as it passes beneath the row of sensors 16, there being provided at least one sensor 16 for each column 10 on the document to be read. In addition, a single timing mark sensor B is provided in line with the row of data sensors 16, the timing mark sensor B being positioned so that the scan track of a properly guided document will pass beneath sensor B and therefore present the timing marks 14 successively to the sensor B as the document travels through the reader. Sensor B is also preferably a photo-transistor or other photo-sensor which will produce a change in current in response to a variation in light intensity. Thus, as each row 12 of data passes beneath the sensors 16, the timing mark sensor B, coupled with appropriate circuitry, will "tell" the sensors 16 to "read," each timing mark 14 passing beneath sensor B causing a pulse to be emitted to trigger sensors 16. In terms of DC logic levels, when voltage or current is "up," a signal is produced by sensor B or it is "on." Conversely, when voltage or current is "down" no signal is produced by sensor B, i.e., it is "off." Obviously the timing marks 14 must be separated so that the intensity of light transmitted or reflected to sensor B varies thus producing the pulse wave form shown in FIG. 4.

Figures 3, 4:
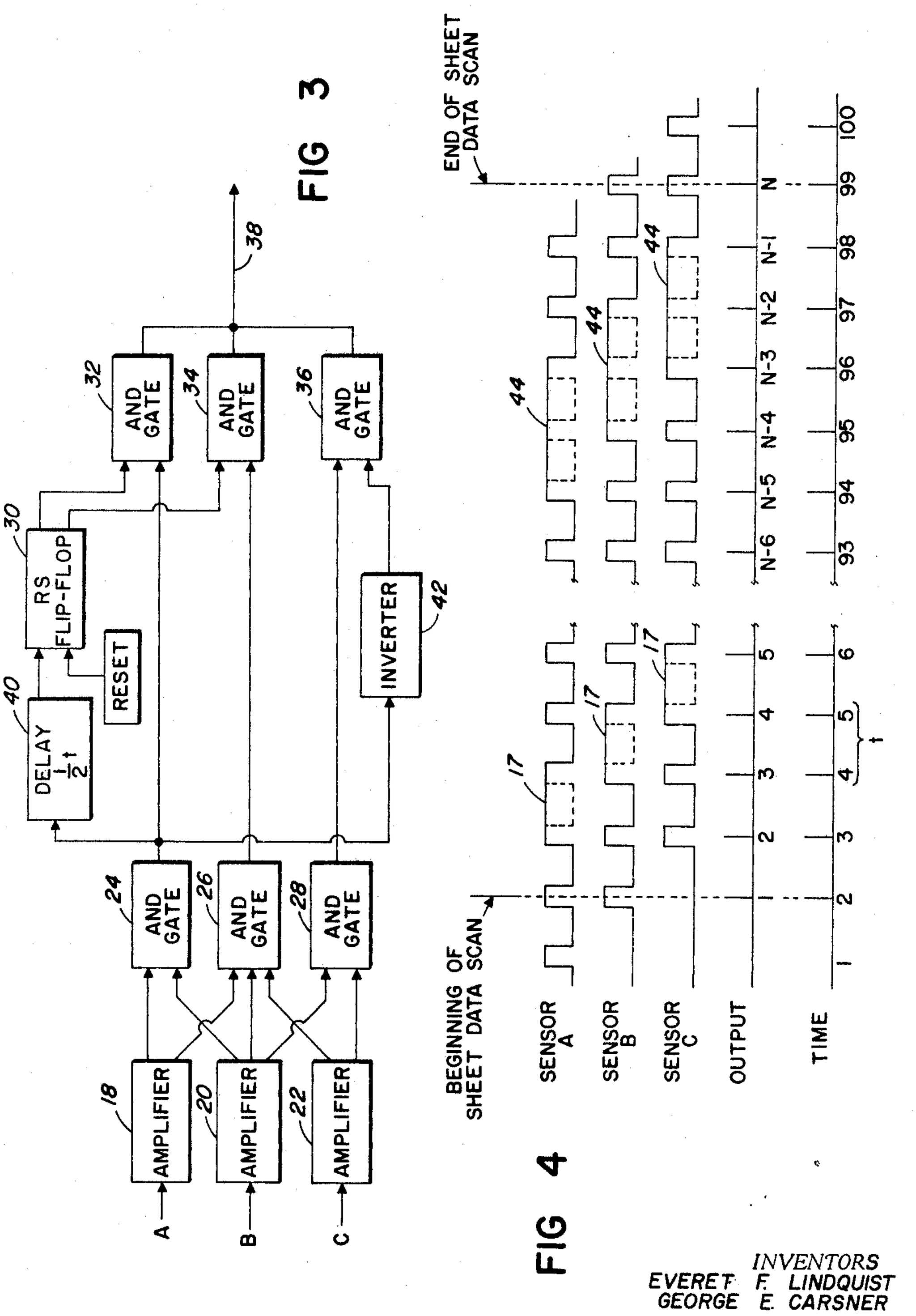
FIG. 3 is a logic circuit diagram showing the circuitry for generating a timing pulse from the signals produced by three timing mark sensors.
FIG. 4 illustrates graphically signals generated by three timing mark sensors with reference to a time scale, and also illustrates the timing of the output signal emitted by the logic circuitry shown in FIG. 3.

If two or more of the timing marks 14 are "bridged," as illustrated at 17 in FIG. 1, sensor B will continue to sense the dark mark and will remain "on" producing only a single pulse as indicated at 17 in FIG. 4. Therefore, a pulse will not be generated to trigger sensors 16 for the row or rows following the row whose timing mark forms the first mark in the bridge, and consequently, the data from these rows will be missed. Although document scanners commonly contain means for indicating that all the rows of a particular document have not been read, it is time-consuming for an operator to manually read the document.

We have therefore devised an improved system containing circuitry which generates timing pulses where the timing marks fail to produce such pulses because of bridging or because, they have in some way become obscured. Our novel system involves the addition of additional timing mark sensors A and C, similar to sensor B. With reference to the drection of document travel through the reader, sensor A is located ahead of sensor B while sensor C is located behind sensor B. Sensors A, B and C are each connected to an amplifier, amplifiers 18, 20 and 22, respectively, the output signals of which are gated as shown in FIG. 3 and described hereinafter. With this arrangement, three of the timing marks 14 will be sensed simultaneously by the sensors A, B and C as each row of data on the document passes beneath the scan head containing data sensors 16. Referring to FIG. 4, the output signals from each of the sensors A, B and C are shown with reference to a time scale, the time interval shown being that required for the document to move a distance "*d*" between any two timing marks 14. As the document enters the reader and its leading edge passes under the scan head at a time designated as "1" on the time scale, the leading edge of the first mark in the series of timing marks 14 (hereinafter referred to as timing mark "1") will be sensed by sensor A and an "on" signal generated. At this instant, time 1, neither sensor B nor sensor C is sensing a timing mark and both are therefore "off." The output signal produced by sensor A through amplifier 18 provides an input to AND gates 24 and 26. However, since neither of the sensors B and C is sensing a timing mark 14, amplifiers 20 and 22 are not generating an output signal, and there will be no signal on the other input line of either AND gate 24 or gate 26. A trigger pulse will therefore not be generated at time 1.

At time 2, the document will have advanced a distance *d* to the position where sensor A senses the leading edge of the second timing mark 14 while sensor B is simultaneously sensing the leading edge of the first timing mark 14. At this instant, time 2, the first row of data information marks is positioned under the row of data sensors 16 in position to be read by the data sensors 16. Since both sensors A and B are "reading" a timing mark 14, amplifiers 18 and 20 will each produce an output signal. These output signals provide a single input to AND gates 26 and 28, but provide signals on both the inputs to AND gate 24 which consequently produces an output signal. Since AND gates 26 and 28 receive a signal on only one input line, no output signal will be produced by either of them. R-S flip-flop 30 is provided in the circuit of FIG. 3 together with suitable means (not shown) to reset it to its original state prior to beginning the scan of a document. In its original state, flip-flop 30 provides an input signal to AND gate 32. Thus, when AND gate 24 produces an output signal, which signal is applied to the other input of AND gate 32, the necessary output pulse is generated on the output line 38 to trigger the data sensors 16 so that the first row of information is read.

The output signal from AND gate 24 is also sent to the input of delay 40 and to inverter 42. Delay 40 is designed to produce an output signal ½*t* later than its input. Thus, after the outputs of amplifiers 18 and 20 are gated through gate 24 at time 2, an output signal will be applied to flip-flop 30 halfway between time 2 and time 3. This output signal from delay 40 causes R–S flip-flop 30 to change its state so that a signal is no longer present at the input to gate 32 but rather a signal is present at one of the inputs to gate 34. The output signal from gate 24 that is fed to inverter 42 has its logic condition changed and therefore produces no signal on the input to AND gate 36.

At time 3 the document will have advanced an additional distance *d*, and sensors A, B and C will each be simultaneously reading the leading edge of a timing mark 14. Therefore, amplifiers 18, 20 and 22 will be producing output signals, and AND gates 24, 26 and 28 will each have signals on both inputs and thereby generate an output signal. Because the state of R–S flip-flop 30 was previously changed by the signal emitted at time 2 from gate 24, AND gate 32 has a signal on only one input and thus produces no output signal. Because of inverter 42, gate 36 has a signal on only one input, the signal from AND gate 28, and therefore produces no output signal. However, AND gate 34 has an input signal from gate 26 and also from flip-flop 30 and consequently produces an output signal on lines 38 at time 3 to trigger data sensors 16 and thereby read the second row of data on the document. With the exception of the last two data rows, the identical conditions will normally exist in the circuit of FIG. 3 at each time after time 3 so an output signal will be produced on line 38 at each time interval to trigger the data sensors 16.

Even if a pair of timing marks 14 are bridged, as indicated at 17 of FIG. 1, and indicated as occurring between times 3 and 4 on FIG. 4, the logic conditions in the circuit of FIG. 3 will be such as to produce an output signal on line 38 at the proper time to trigger the data sensors 16. In this regard, it should be noted that it is necessary for at least one of the sensors A, B, or C to be reading the leading edge of a mark if a trigger pulse is to be produced on line 38. As time 3 approaches, all three sensors A, B and C will be "on," each reading the leading edge of a timing mark 14. The logic gating conditions in the circuit will therefore be as described above so that a single output signal is produced on the output line 38. As the document continues to advance and the time approaches time 4, both sensors B and C will be reading leading edges of a mark and will be "on." Sensor A would, under normal conditions, also read the leading edge of a mark, but since the space between the marks has been bridged, the logic level of sensor A has remained "on." Therefore, the logic conditions of the circuit are the same at time 4 as at time 3 with gates 24, 26 and 28 each producing an output signal and an output pulse thereby being produced through gate 34. Similar logic conditions also exist at times 5 and 6. In other words, as the document advances and time 5 is approached, sensors A and C are reading leading edges while sensor B is reading the "bridge" and therefore the logic levels of all sensors are on. Similarly, as time 6 is approached, sensors A and B are reading leading edges while sensor C is reading the bridge and the logic levels are again "on." Thus, in spite of the bridge 17, the conditions in the circuit of FIG. 3 remain the same and a trigger pulse will be produced on output line 38 at each time interval.

The circuit shown in FIG. 3 will also produce the required trigger pulses to assure reading of each and every data row even though a "double bridge" is encountered. As indicated at 44 of FIG. 1, a double bridge is three consecutive marks that are joined or bridged. Referring to FIG. 4, it is seen that trigger pulses will continue to be produced at each time interval so that the data rows are properly read in spite of the double bridge. To illustrate, during the interval between time 94 and time 95, sensor A remains on and as time 95 approaches, sensors B and C will both be reading leading edges. Between time 95 and time 96, both sensors A and B remain on, and as time 96 approaches, sensor C will read the leading edge of a mark. Similarly, as time 97 is approached, sensor A will read a leading edge while the logic levels of both sensors B and C remain on, and as time 98 is approached both sensors A and B will be reading leading edges while the logic condition of sensor C remains on. Thus, in spite of the bridge 44, gate 26 was open at each time interval and a trigger pulse was generated on output line 38 at each interval.

The circuit of FIG. 3 will provide the proper trigger pulses unless more than three consecutive timing marks are bridged. If four or more marks are bridged, the gating and logic levels would be the same as previously described except that at one or more of the times *t* required to traverse the bridge, a "no leading edge" condition would occur and a trigger pulse would not be emitted by gate 34. It should be understood, however, that with the use of additional timing mark sensors and similar circuitry added to the basic circuit of FIG. 3 bridges of more than three consecutive marks could be handled. However, as a practical matter, circuitry that will produce proper pulses when three or less marks are bridged will correct most of the situations encountered.

It will be evident from a study of the circuitry of FIG. 3 that the logic conditions change when the last or $N^{th}$ data row on a document is to be read. Since the $N^{th}$ timing mark has passed sensor A, its logic level is "down" or "off," and thus there is no output signal emitted by either gates 24 or 26. Sensors B and C are still reading timing marks and therefore their logic levels are "up" and gate 28 produces an output signal on one of the inputs to AND gate 36. By reason of inverter 42, an input signal is produced on the other input of gate 36 and thus a pulse is produced on output line 38 at the required time to read the last data row of the document.

One minor limitation of the circuitry of FIG. 3 is that only a single bridge can be corrected if it occurs at the leading or trailing edges of the document; that is, between timing marks 1 and 2, or between timing marks N and N–1. Double bridges, i.e., between three consecutive marks, at the beginning or end of the document, will result in a missing trigger pulse and a failure to read a data row.

The illustrated embodiment which has been described herein was designed specifically for documents already existing in the field where timing marks and data rows bear a 1-to-1 relationship. However, by properly designing a document with an extra timing mark prior to the one for the first data row and an extra mark following the timing mark for the last or $N^{th}$ data row, the logic circuit of FIG. 3 can be considerably simplified. With such documents, all of the logic elements of FIG. 3 can be deleted except amplifiers 18, 20 and 22 and AND gates 26 and 34. With this simplified circuit, the output of gate 26 will have to be connected to both inputs of gate 34, or gate 34 could also be eliminated and the output of the circuit taken directly from gate 26. Because of the two additional timing marks on the data sheet, this simplified circuit will satisfy the logic state necessary to produce a trigger pulse for data rows at the beginning and end of the data sheet and consequently it will correct for even double bridges throughout the full length of the data sheet. Of course, if the basic system is expanded to more than three sensors to correct for longer bridges, additional pre- and post-data row timing marks would have to be printed. It will also be obvious to those skilled in the art that additional modifications and variations to the illustrated embodiment can be made without departing from the spirit and scope of the invention. It is our intention, however, that such revisions and modifications as are obvious to those skilled in the art will be included within the scope of the following claims.

We claim:

1. In an apparatus for processing data contained on a document or the like moving through said apparatus and which document has a series of linearly spaced-apart indicators each of which normally causes the activation of one or more data sensors in said apparatus so as to read said data, the combination of: data sensors for reading bits of data contained on a document moving by said data sensors, and means for producing signals to activate said data sensors at the proper time to read said data bits, said means comprising a plurality of indicating sensors spaced apart along a line oriented parallel to the direction of travel of the document so that said indicators all sequentially pass by each of said indicating sensors and activate each indicating sensor until deactivated by a space between indicators, and means combined with said indicating sensors for activating said data sensors only when simultaneously at least two of said indicating sensors are in an activated state and at least one of said indicating sensors becomes activated from a deactivated state.

2. In the apparatus of claim 1 for processing data-containing documents on which the indicators corresponding to the data to be read are uniformly spaced apart, said apparatus having indicating sensors which are uniformly spaced apart along said line a distance corresponding to the spacing of the uniformly spaced indicators.

3. In the apparatus of claim 2 in which there are "N" indicating sensors, and said last named means activates said data sensors only when at least $N-1$ of said indicating sensors simultaneously are in an active state and at least one of said indicating sensor becomes activated from a deactivated state, where N is any positive whole number greater than one.

4. In the apparatus of claim 2 in which an output signal from each indicating sensor provides an input signal to an AND gate, the output signal from said gate being gated with a signal originating from another of said indicating sensors to produce an output pulse and thereby activate said data sensors.

5. In the apparatus of claim 3 in which there are N first AND gates, the output signal generated from each of said indicating sensors producing an input signal on at least two of said first gates, N second AND gates, the output signals from said first gates producing one of the input signals to a corresponding second gate, the output signal from one of said first gates also producing an input to each of said second gates at selected controlled times so that one of said second gates will produce an output pulse whenever $N-1$ of said indicating sensors simultaneously are in an active state and at least one of said indicating sensors becomes activated from a deactivated state, where N is any positive whole number greater than one.

6. In an apparatus for reading data bits contained on a document or the like moving through said apparatus, said documents having data indicating spaces arranged in a plurality of columns and uniformly spaced rows on said document and having a column of timing marks, one such mark corresponding to each of the data rows to be read, the combination of: a plurality of data sensors positioned to be in alignment with the columns of a document passing through the apparatus to read data bits contained in said columns, a plurality of timing mark sensors spaced apart along a line transverse to said data sensors so that the timing marks of a document all sequentially pass by each of said timing mark sensors as said document passes through the apparatus, said timing mark sensors being uniformly spaced apart along said line a distance corresponding to the spacing of said timing marks, means to cause each of said timing mark sensors to produce an output signal when a timing mark is sensed and to continue to produce said signal until a space between timing marks occurs, and means for utilizing said signals to produce a timing pulse and thereby activate said data sensors only when simultaneously at least two of said timing mark sensors are producing an output signal and at least one of said timing mark sensors changes from a non-signal producing state to a signal-producing state.

7. In the apparatus of claim 6 in which the signals from said timing mark sensors are gated to produce a single timing pulse each time two or more of said timing mark sensors are producing an output signal and at least one of said timing mark sensors changes from a non-signal producing state to a signal-producing state.

8. In the apparatus of claim 7 in which there are N timing mark sensors, there being provided N first AND gates, the output signal of each of said timing mark sensors producing an input signal on at least two of said first gates, and N second AND gates, the output signals from said first gates producing one of the input signals to a corresponding second gate, the output signal from one of said first gates also producing an input to each of said second gates at selected controlled times so that one of said second gates will produce a timing pulse whenever simultaneously $N-1$ of said timing mark sensors produce an output signal and at least one of said timing mark sensors goes from a non-signal producing state to a signal-producing state.

References Cited

UNITED STATES PATENTS

| | | | |
|---|---|---|---|
| 2,628,346 | 2/1953 | Burkhart. | |
| 2,797,402 | 6/1957 | Duffey et al. | |
| 3,040,984 | 6/1962 | Cox et al. | 340—146.1 |
| 3,124,662 | 3/1964 | Ryder. | |
| 3,207,845 | 9/1965 | Swenson. | |

DARYL W. COOK, Primary Examiner

THOMAS J. SLOYAN, Assistant Examiner

U.S. Cl. X.R.

235—61.12; 250—219